United States Patent

Shimura et al.

[11] Patent Number: 5,103,089
[45] Date of Patent: Apr. 7, 1992

[54] ANGULAR DISPLACEMENT DETECTING DEVICE

[75] Inventors: Shoichi Shimura, Kanagawa; Naoki Kobayashi, Tokyo; Kazuhiro Ohki, Kanagawa, all of Japan

[73] Assignee: Canon Kabushiki Kaisha, Tokyo, Japan

[21] Appl. No.: 640,979

[22] Filed: Jan. 14, 1991

[30] Foreign Application Priority Data

Jan. 18, 1990 [JP] Japan ................................. 2-009324
Jan. 18, 1990 [JP] Japan ................................. 2-009325

[51] Int. Cl.⁵ .............................................. G01D 5/30
[52] U.S. Cl. ............................ 250/231.13; 250/231.12; 250/230
[58] Field of Search ............. 250/230, 231.13, 231.12, 250/201.1, 231.1, 237 G; 73/516; 324/214; 354/289.12

[56] References Cited

U.S. PATENT DOCUMENTS 2,871,706 6/1956 Fischer et al. .................. 250/231.12
4,339,959 7/1982 Klaus, Jr. et al. ............... 250/231.12
4,694,614 9/1987 Wilson et al. .................... 250/231.1

Primary Examiner—Edward P. Westin
Assistant Examiner—T. Davenport
Attorney, Agent, or Firm—Robin, Blecker, Daley & Driscoll

[57] ABSTRACT

An angular displacement detecting device which is provided with a tubular casing having a chamber in which a liquid is sealed, a floating body having a magnetic characteristic, the floating body being disposed in the liquid sealed in the chamber and being supported for rotation about a predetermined rotational axis, a magnetism generating member for cooperating with the floating body to constitute a magnetic circuit, and a detector for detecting a relative rotation about the rotational axis between the floating body and the tubular casing. The floating body is formed of either a material in which a magnetic material powder with a particle size of 10 μm or less is dispersedly mixed with a thermoplastic, high polymeric organic material or a material in which a magnetic material powder whose particles are coated with a silane or titanium coupling agent is mixed with a thermoplastic, high polymeric organic material.

53 Claims, 2 Drawing Sheets

ANGULAR DISPLACEMENT DETECTING DEVICE

BACKGROUND OF THE INVENTION

1. Field of the Invention

The present invention relates to a device for detecting an angular displacement relative to absolute space by utilizing the inertia of a liquid and, for example, to an angular displacement detecting device suitable for use in detecting an image shake which may occur during photography using a camera.

2. Description of the Related Art

A conventional angular displacement detecting device of this type is basically constructed as described below in detail, as disclosed in U.S. Pat. application Ser. No. 637,532, filed on Jan. 4, 1991, and Japanese Laid-open Patent Application Nos. Hei 2-82165 and Hei 2-102414. The construction will be explained with reference to FIGS. 1 to 3.

As shown in these figures, the conventional angular displacement detecting device comprises a base 1 to which individual parts for constituting the device are secured in position, and a tubular casing 2 serving as a sealed liquid container having a chamber in which a floating body 3 and a liquid 4 are sealed. The tubular casing 2 has a groove 2a which is formed in its inner wall so as to securely engage with a floating-body support 14 having a U-like cross section as shown in detail in FIG. 3. The floating body 3 has magnetic characteristics, and is supported for rotation about an axis 3a by the floating-body support 14. Mirrors 9 are respectively secured to one pair of opposed side faces of the central block of the floating body 3, and each of the mirrors 9 is covered by a mask 10 having a slit 10a. Arms 3b extend from the other pair of opposed side faces of the central block, respectively. The floating body 3 is constructed so as to maintain the balance of buoyancy in the liquid 4 by making their specific gravities coincide with each other.

It is to be noted that the liquid 4 sealed in the tubular casing 2 is a transparent liquid.

A light emitting element (IRED) 5, which is adapted to emit light by energization, is secured to the base 1 via a light-emitting element carrier 7. A light receiving element (PSD) 6 utilizes a photoelectric conversion device whose output varies with the position where light is received, and is fixed to the base 1 via a light-receiving-element carrier 8. The light emitting element 5 and the light receiving element 6 constitute optical angular displacement detecting means of the type which transmits light by means of either of the mirrors 9 secured to the opposed side faces of the central block of the floating body 3. A light guide portion 7a is formed on the light-emitting element carrier 7 for guiding light emitted from the light emitting element 5, and a mask 10' is secured to the distal end of the light guide portion 7a. The mask 10' has a slit 10a' identical to the slit 10a of the mask 10. Since light transmission is effected through the tubular casing 2, the whole or a predetermined portion of the tubular casing 2 is formed of a transparent material.

A pair of yokes 19 and 20 is disposed in such a manner as to produce a magnetic field action for holding the floating body 3 having the magnetic characteristics in a fixed position, i.e., in a position where the floating body 3 takes the shown attitude. Opposed ends of the respective yokes 19 and 20 are spaced apart from each other along the diameter of the tubular casing 2 as shown in FIG. 1. A yoke 21 is interposed between the other end portions of the yokes 19 and 20, and a solenoid coil 22 is fitted onto the yoke 21. The above-described arrangement allows a magnetic circuit to be formed by the yokes 19, 20 and 21 and the floating body 3, and a magnetic force is imparted to the floating body 3 by the magnetic force produced by the solenoid coil 22.

The above-described rotatable supporting of the floating body 3 is accomplished in the following manner. As shown in FIG. 2 in cross-sectional form, a rotary shaft 11 extends through the central block of the floating body 3 in the vertical direction, and a pivot 12 having an outwardly pointed end is press-fitted into each of the top and bottom ends of the rotary shaft 11. Pivot bearings 13 are secured respectively to the end portions of the upper and lower arms of the U-like shape of the floating body support 14 in such a manner that they are opposed to each other in the inward direction. The floating body 3 is supported by the engagement between the pointed ends of the pivots 12 and the corresponding pivot bearings 13.

A lid 15 is bonded to the tubular casing 2 in a sealed manner by a known art utilizing a silicone adhesive or the like. A packing rubber 16 is sandwiched between a pressure disk 17 and the lid 15, and is fixed by screws or the like.

In the above-described arrangement, the floating body 3 is constructed so that the balance of buoyancy in the liquid 4 can be maintained as described previously in order to prevent a substantial load from acting on the pivotal axis of the device by the influence of gravitation.

According to the above-described arrangement, even if the tubular casing 2 rotates about the rotational axis 3a, an inner portion of the liquid 4 does not move owing to inertia and, therefore, the floating body 3 which is in a floating state does not rotate. As a consequence, the tubular casing 2 and the floating body 3 rotate about the rotational axis 3a with respect to each other. This is the principle of the present inventive device for detecting a relative angular displacement, and the relative angular displacement can be detected by the optical detecting means utilizing the light emitting element 5 and the light receiving element 6.

In practice, a flow is produced in the inner portion of the liquid 4 by the influence of the wall surface of the tubular casing 2, and the flow applies a viscosity force to the floating body 3. The influence of the flow, however, can be minimized by appropriately selecting factors such as the distance between the wall surface and the floating body 3 and the viscosity of the liquid 4.

In the device having the above-described arrangement, detection of an angular displacement is accomplished in the following manner.

Light emitted from the light emitting element 5 through the light guide 7a illuminates the floating body 3, and light reflected by an illuminated one of the mirrors 9 reaches the light receiving element 6. As described above, the mask 10' is secured to the distal end of the light guide 7a, while the mask 10 is secured to each of the mirrors 9 of the floating body 3. Accordingly, the light is approximately collimated by the slit 10a of the mask 10 during light transmission, whereby a sharply focused image (slit image) is formed on the light receiving element 6.

The tubular casing 2, the light emitting element 5 and the light receiving element 6 integrally move since all of them are secured to the base 1. If a relative angular displacement occurs between the tubular casing 2 and the floating body 3, the slit image on the light receiving element 6 will move by an amount corresponding to the relative angular displacement. Accordingly, the light receiving element 6, which utilizes a photoelectric conversion device whose output varies with the position where light is received, produces an output substantially proportional to the positional displacement of the slit image. It is, therefore, possible to detect the angular displacement of the tubular casing 2 by utilizing such an output as information.

In the case of the angular displacement detecting device having the above-described arrangement, since the floating body 3 is not subjected to an external force, the attitude of the floating body 3 cannot be restricted. As a result, it might be considered impossible to ensure that the slit image is positioned within the measurement range of the light receiving element 6. However, if, for example, the above-described solenoid coil 22 is used to exert a weak magnetic field action on the floating body 3, the magnetic field action can be made to act as a spring force which produces a force locating the floating body 3 at the steady position shown in FIG. 1.

The spring force exerted on the floating body 3 by the magnetic field action is theoretically a force which maintains the floating body 3 in a fixed attitude with respect to the tubular casing 2, i.e., a force which acts to move the floating body 3 integrally with the tubular casing 2. If such spring force is excessively strong, the tubular casing 2 and the floating body 3 will move integrally, thus resulting in the problem that a relative angular displacement required for a desired angular displacement is not produced. However, if the magnetic field action is made sufficiently small with respect to the inertia of the liquid 4, it is possible to realize an arrangement capable of responding to an angular displacement of relatively low frequency as well.

In general, to improve the detection sensitivity of such an arrangement, it is indispensable that the specific gravity of a floating body be made to coincide with that of a liquid, thereby preventing a substantial load from acting on the pivotal axis of the device by the influence of gravitation. However, even in a case where the specific gravity of the floating body is macroscopically coincident with that of the liquid, if microscopic variations exist in the specific gravity of the floating body, angular moment corresponding to $\Delta\rho \times V \times l \times g$ will be produced about the pivotal axis, where $\Delta\rho$ is the difference in the specific gravity, V is the volume of a portion where the microscopic variations exist, l is the distance from the pivotal axis to the center of gravity and g is gravitational acceleration. As is apparent from the principle of the present invention, a force which acts to locate the floating body at a steady position is applied thereto as a spring force by utilizing the magnetic field action produced by a solenoid coil.

Accordingly, if the angular moment about the pivotal axis due to the microscopic variations in the specific gravity of the floating body is greater than the spring force, the floating body will rotate by the influence of gravitation. If the rotation of the floating body is to be inhibited, it is necessary to increase the spring force. However, if the spring force is increased, the floating body will move integrally with the tubular casing, thus resulting in the problem that a relative angular displacement required for a desired angular displacement is not produced. For this reason, since the detection sensitivity becomes higher as the spring force is made weaker, it is desired to minimize variations in the specific gravity of the floating body.

SUMMARY OF THE INVENTION

It is, therefore, an object of the present invention to provide an angular displacement detecting device capable of solving the above-described conventional problems and of achieving satisfactory detection sensitivity by using a floating body whose variations in specific gravity are reduced.

To achieve the above object, according to one aspect of the present invention, there is provided an angular displacement detecting device which is provided with a tubular casing having a chamber in which a liquid is sealed, a floating body having a magnetic characteristic, the floating body being disposed in the liquid sealed in the chamber and being supported for rotation about a predetermined rotational axis, magnetism generating means for cooperating with the floating body to constitute a magnetic circuit, and detecting means for detecting a relative rotation about the rotational axis between the floating body and the tubular casing. The floating body is formed of a material in which a magnetic material powder with a particle size of 10 $\mu$m or less is dispersedly mixed with a thermoplastic, high polymeric organic material so that it is possible to minimize variations in the specific gravity of the floating body. Accordingly, the spring force produced by the magnetic field action of a solenoid coil can be reduced to improve detection sensitivity.

To achieve the above object, according to another aspect of the present invention, there is provided an angular displacement detecting device which is provided with a tubular casing having a chamber in which a liquid is sealed, a floating body having a magnetic characteristic, the floating body being disposed in the liquid sealed in the chamber and being supported for rotation about a predetermined rotational axis, magnetism generating means for cooperating with the floating body to constitute a magnetic circuit, and detecting means for detecting a relative rotation about the rotational axis between the floating body and the tubular casing. The floating body is formed of a material in which a magnetic material powder whose particles are coated with a silane or titanium coupling agent is mixed with a thermoplastic, high polymeric organic material, whereby the state of dispersion of the magnetic material powder can be improved to minimize variations in the specific gravity of the floating body. Accordingly, the spring force produced by the magnetic field action of a solenoid coil can be reduced to improve detection sensitivity.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
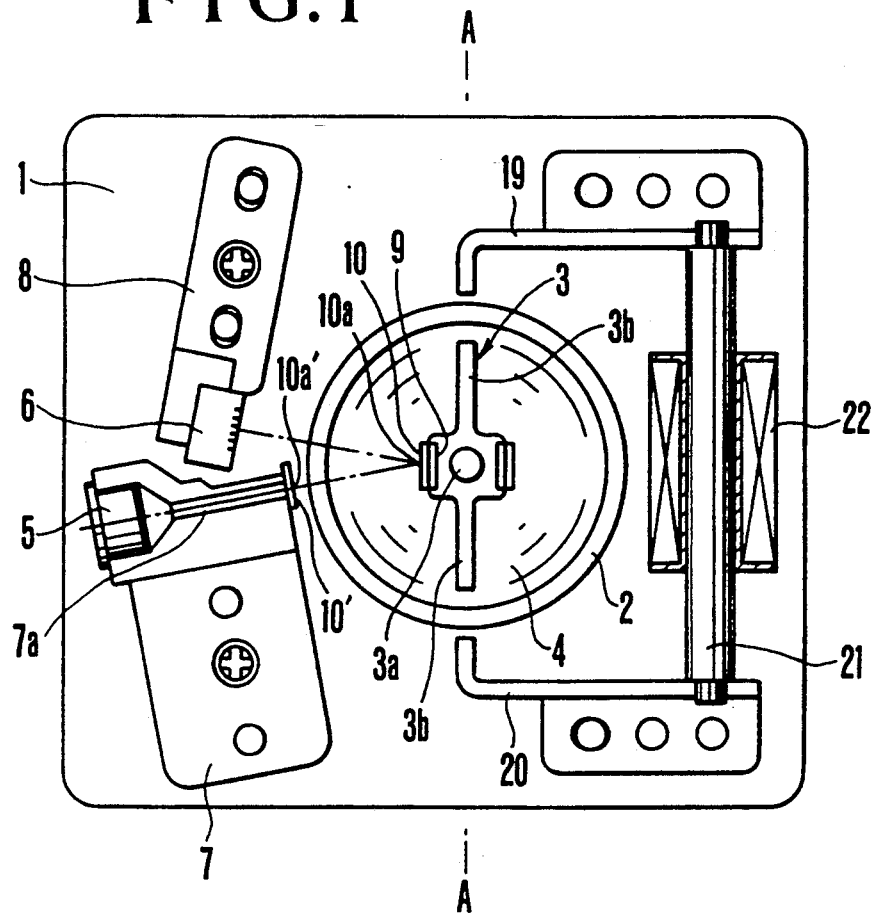
FIG. 1 is a diagrammatic plan view of an angular displacement detecting device, which serves to illustrate an embodiment of the present invention as well as a conventional example.
Figure 2:
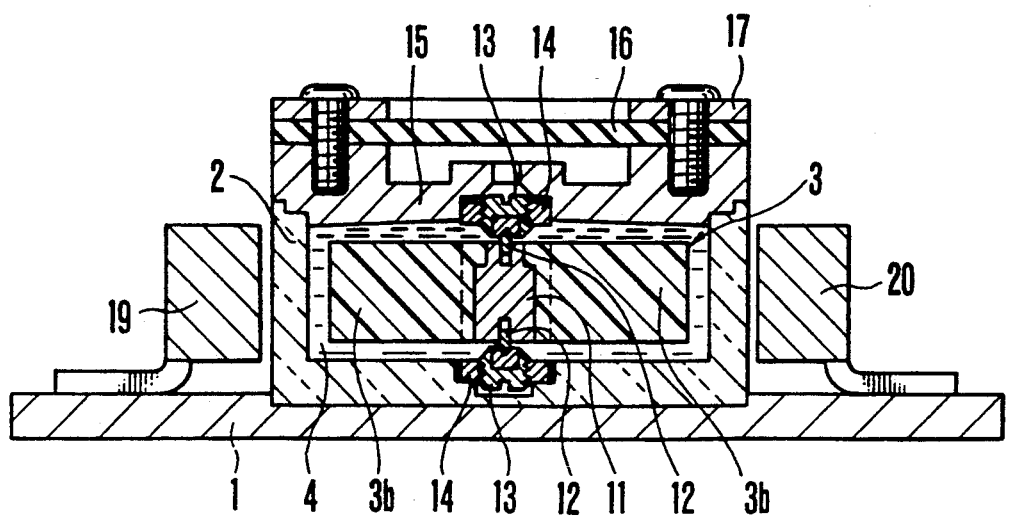
FIG. 2 is a cross-sectional view taken along line A—A of FIG. 1.
Figure 3:
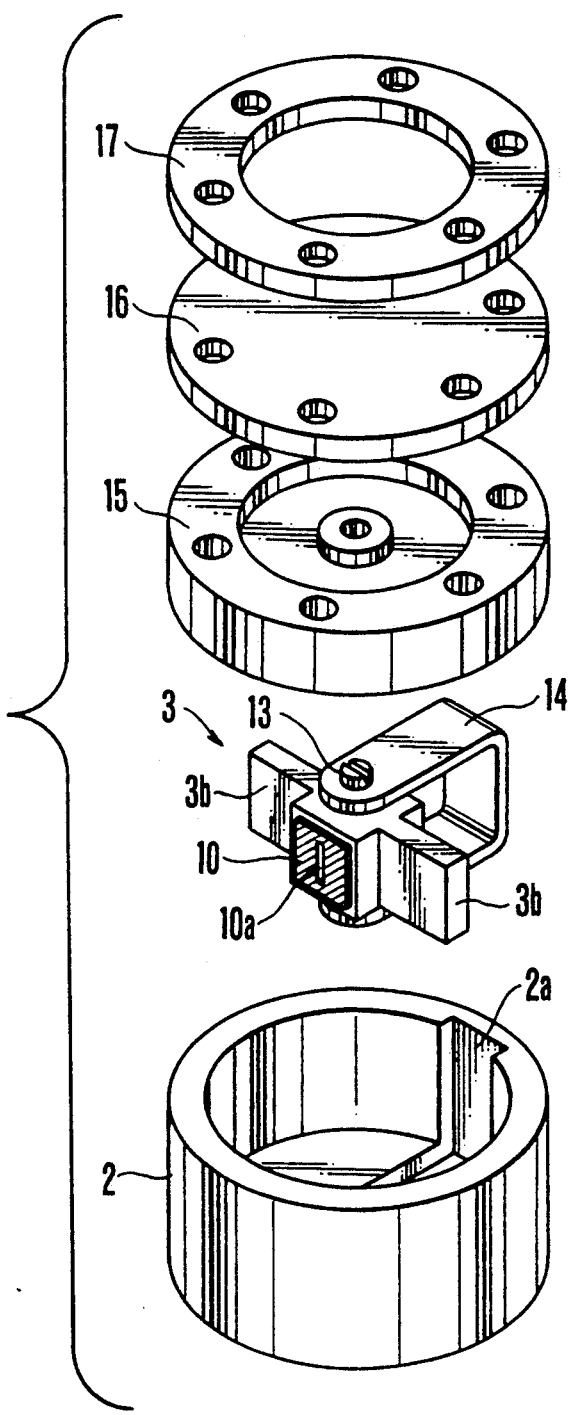
FIG. 3 is a partial exploded perspective view showing the device of FIG. 1.

The mechanical construction of an angular displacement detecting device according to each of the following embodiments is substantially identical to that of the device shown in FIGS. 1 to 3.

In these figures, the floating body 3 according to a first embodiment is preferably formed of a material in which a magnetic material powder with a particle size of 10 μm or less is dispersedly mixed with a thermoplastic, high polymeric organic material.

The thermoplastic, high polymeric organic material is preferably selected from the group consisting of polyethylene, polypropylene, polymethylpentene-1, polystyrene, ABS, polymethyl methacrylate, polycarbonate, polyoxymethylene, polyamide, polyethylene terephthalate, polybutylene telephthalate, polyphenylene sulfide, polyacrylate, polysulfone, polyether sulfone, polyether imide, polyether ether ketone, aromatic liquid crystal polyester and the like.

The magnetic material powder is preferably at least one kind selected from the group consisting of nickel, a nickel-iron alloy, iron, magnetite, ferrite such as barium ferrite or strontium ferrite, a rare-earth alloy such as neodymium-iron-cobalt or samarium-cobalt.

It is to be noted that the mixture ratio of the magnetic material powder to the thermoplastic, high polymeric organic material is selected to make the specific gravity of a floating body coincide with that of a liquid used. (If the specific gravity of the liquid varies with temperature, such mixture ratio is selected so that the specific gravities of both coincide with each other at a temperature where the device is used.)

To prepare a dispersion mixture of the magnetic material powder and the thermoplastic, high polymeric organic material, it is preferable to melt and mix the by heating by using a commonly employed apparatus such as a roll, a kneader, an extruder or the like. It is more preferable to premix them in a mixer or the like at room temperature. In this case, it is preferable that the thermoplastic, high polymeric organic material be used in a powdered form.

As a forming process for the floating body 3, an injection molding process is suitable from the viewpoint of productivity.

The first embodiment will be explained below in greater detail with reference to several examples.

EXAMPLE 1

A polybutylene telephthalate resin powder and an iron powder having a particle size distribution of 3 μm to 10 μm were premixed by using a mixer. The mixture was thermally melted and kneaded by using a two-screw extruder, and was then subjected to pelletizing. The pellet was formed into the floating body 3 shown in FIG. 1 by using an injection molding machine. The specific gravity of the floating body 3 was found to be 1.7656 by measurement with an underwater substitution method. The content of iron powder at this time was 30.68 percent by weight. Subsequently, an angular displacement detecting device, such as that shown in FIG. 1, was prepared using the floating body 3 and a fluoroliquid whose specific gravity was 1.76. While the device was operating, no rotary motion about the pivotal axis took place and detection sensitivity to angular displacement was not impaired.

The floating body 3 was taken out and divided into two longitudinal parts, and the specific gravity of each of the parts was measured by an underwater substitution method. The difference between their specific gravities was 0.0032.

EXAMPLE 2

A polybutylene telephthalate resin powder and a strontium ferrite powder having a particle size distribution of 1.0 μm to 3 μm were formed into the floating body 3 by a process similar to that used in Example 1. The specific gravity of this floating body 3 was found to be 1.7632 by measurement with an underwater substitution method. The content of strontium powder at this time was 34.27 percent by weight. Subsequently, an angular displacement detecting device was prepared using the floating body 3 and a fluoroliquid which was identical to that used in Example 1. While the device was operating, no rotary motion about the pivotal axis took place and detection sensitivity to angular displacement was not impaired.

The floating body 3 was taken out and divided into two longitudinal parts, and the specific gravity of each of the parts was measured by an underwater substitution method. The difference between their specific gravities was 0.0038.

EXAMPLE 3

A polybutylene telephthalate resin powder and a magnetite powder having a particle size distribution of 0.3 μm to 2 μm were formed into the floating body 3 by a process similar to that used in Example 1. The specific gravity of this floating body 3 was found to be 1.7638 by measurement with an underwater substitution method. The content of magnetite powder at this time was 33.87 percent by weight. Subsequently, an angular displacement detecting device was prepared using the floating body 3 and a fluoroliquid which was identical to that used in Example 1. While the device was operating, no rotary motion about the pivotal axis took place and detection sensitivity to angular displacement was not impaired.

The floating body 3 was taken out and divided into two longitudinal parts, and the specific gravity of each of the parts was measured by an underwater gravities was 0.0026.

COMPARATIVE EXAMPLE 1

A polybutylene telephthalate resin powder and an iron powder having a particle size distribution of 15 μm to 25 μm were formed into a floating body by a process similar to that used in Example 1. The specific gravity of this floating body was found to be 1.7652 by measurement with an underwater substitution method. The content of iron powder at this time was 30.65 percent by weight. Subsequently, an angular displacement detecting device was prepared using the floating body and a fluoroliquid which was identical to that used in Example 1. While the device was operating, a rotary motion about the pivotal axis was observed. When the amount of current to be supplied to the solenoid coil was increased to prevent the rotary motion, a decrease occurred in detection sensitivity to angular displacement.

The floating body was taken out and divided into two longitudinal parts, and the specific gravity of each of the parts was measured by an underwater substitution method. The difference between their specific gravities was 0.0056.

COMPARATIVE EXAMPLE 2

A polybutylene telephthalate resin powder and an iron powder having a particle size distribution of 2 μm to 20 μm were formed into a floating body by a process similar to that used in Example 1. The specific gravity of this floating body was found to be 1.7660 by measurement with an underwater substitution method. The content of iron powder at this time was 30.70 percent by weight. Subsequently, an angular displacement detecting device was prepared using the floating body and a fluoroliquid which was identical to that used in Example 1. While the device was operating, a rotary motion about the pivotal axis was observed. When the amount of current to be supplied to the solenoid coil was increased to prevent the rotary motion, a decrease occurred in detection sensitivity to angular displacement.

The floating body was taken out and divided into two longitudinal parts, and the specific gravity of each of the parts was measured by an underwater substitution method. The difference between their specific gravities was 0.0083.

As described above, according to the first embodiment, the floating body 3 is formed of a material in which a magnetic material powder with a particle size of 10 μm or less is dispersedly mixed with a high polymeric organic material so that it is possible to minimize variations in the specific gravity of the floating body. Accordingly, the spring force produced by the magnetic field action of a solenoid coil can be reduced and satisfactory detection sensitivity can be achieved with current consumption reduced.

A second embodiment of the present invention will be described below.

According to the second embodiment, the floating body 3 is formed of a material in which a magnetic material powder whose particles are coated with a silane or titanium coupling agent is mixed with a thermoplastic, high polymeric organic material.

The second embodiment is similar to the first embodiment with respect to the preferable kind of thermoplastic, high polymeric organic material, the preferable kind of magnetic material powder, the mixture ratio of the magnetic material powder to the thermoplastic, high polymeric organic material, the dispersion mixture ratio of the magnetic material powder to the thermoplastic, high polymeric organic material, a forming process for the floating body 3 and so forth.

The silane coupling agent is preferably selected from the group consisting of γ-chloropropyl trimethoxy silane, vinyltrichlorosilane, vinyltriethoxysilane, vinyltris(β-methoxyethoxy) silane, γ-methacryloxypropyl trimethoxy silane, β-(3,4-epoxycyclohexyl)ethyl trimethoxy silane, γ-glycidoxyproplyl trimethoxy silane, γ-mercaptopropyl trimethoxy silane, γ-aminopropyl triethoxy silane, N-β-(aminoethyl)-γ-aminopropyl trimethoxy silane, γ-ureidopropyl triethoxy silane, N-γ-(aminoethyl) β-aminopropyl methyldimethoxy silane and so forth.

The titanium coupling agent is preferably selected from the group consisting of isopropyl tri-isostearoyl titanate, isopropyl tridodecylbenzene sulfonyl titanate, tetraisopropylbis(dioctylphosphate) titanate, tetraoctylbis(di-tridecylphosphate) titanate, tetra(2,2-diaryloxmethyl-1-butyl)bis(di-tridecyl)phosphate titanate, bis(-dioctylpyrophosphate) oxyacetate titanate, tris(dioctylpyrophosphate)ethylene titanate and so forth.

The second embodiment will be explained below in greater detail with reference to several examples.

EXAMPLE 4

A polybutylene telephthalate resin powder and an iron powder with an average particle size of 20 μm, whose particles were coated with a silane coupling agent consisting of γ-aminopropyl triethoxy silane, were premixed by using a mixer. The mixture was thermally melted and kneaded by using a two-screw extruder, and was then subjected to pelletizing. The pellet was formed into the floating body 3 shown in FIG. 1 by using an injection molding machine. The specific gravity of the floating body 3 was found to be 1.7650 by measurement with an underwater substitution method. The content of iron powder at this time was 30.65 percent by weight. Subsequently, an angular displacement detecting device, such as that shown in FIG. 1, was prepared using the floating body 3 and a fluoroliquid with a specific gravity of 1.76. While the device was operating, no rotary motion about the pivotal axis took place and detection sensitivity to angular displacement was not impaired.

The floating body 3 was taken out and divided into two longitudinal parts, and the specific gravity of each of the parts was measured by an underwater substitution method. The difference between their specific gravities was 0.0022.

EXAMPLE 5

A polybutylene telephthalate resin powder and an iron powder (identical to that used in Example 4) with an average particle size of 20 μm, whose particles were coated with a silane coupling agent consisting of isopropyl tri-isostearoyl titanate, were formed into the floating body 3 by a process similar to that used in Example 4. The specific gravity of this floating body 3 was found to be 1.7658 by measurement with an underwater substitution method. The content of iron powder at this time was 30.70 percent by weight. Subsequently, an angular displacement detecting device was prepared using the floating body 3 and a fluoroliquid which was identical to that used in Example 4. While the device was operating, no rotary motion about the pivotal axis took place and detection sensitivity to angular displacement was not impaired.

The floating body 3 was taken out and divided into two longitudinal parts, and the specific gravity of each of the parts was measured by an underwater substitution method. The difference between their specific gravities was 0.0031.

COMPARATIVE EXAMPLE 3

A polybutylene telephthalate resin powder and an iron powder (identical to those used in Examples 4 and 5) with an average particle size of 20 μm, whose particles were not coated with a coupling agent, were formed into a floating body by a process similar to that used in Example 4. The specific gravity of this floating body was found to be 1.7652 by measurement with an underwater substitution method. The content of iron powder at this time was 30.65 percent by weight. Subsequently, an angular displacement detecting device was prepared using the floating body and a fluoroliquid which was identical to that used in Example 4. While the device was operating, a rotary motion about the pivotal axis was observed. When the amount of current to be supplied to the solenoid coil was increased to prevent the rotary motion, a decrease occurred in detection sensitivity to angular displacement.

The floating body was taken out and divided into two longitudinal parts, and the specific gravity of each of the parts was measured by an underwater substitution method. The difference between their specific gravities was 0.0056.

As described above, according to the second embodiment, the floating body 3 is formed of a material in which a magnetic material powder whose particles are coated with a silane or titanium coupling agent is mixed with a thermoplastic, high polymeric organic material so that the state of dispersion of the magnetic material powder can be improved to minimize variations in the specific gravity of the floating body. Accordingly, the spring force produced by the magnetic field action of a solenoid coil can be reduced and satisfactory detection sensitivity can be achieved with current consumption reduced.

It is to be understood that the scope of the present invention is not limited to either of the above-described first and second embodiments and is to be construed as encompassing a combination of these embodiments.

Although each of the above-described embodiments refers to an angular displacement detecting device, the present invention can, of course, be applied to devices of various kinds for performing detection of relative movement, such as displacement detection, velocity detection, angular-velocity detection, acceleration detection and angular-acceleration detection.

What is claimed is:

1. An angular displacement detecting device comprising:
   (A) a tubular casing having a chamber in which a liquid is sealed;
   (B) a detecting body disposed in said liquid sealed in said chamber, and supported for rotation about a predetermined rotational axis, a magnetic material powder with a particle size of 10 μm or less being dispersedly mixed in said detecting body;
   (C) magnetic-path forming means for forming a magnetic path including said detecting body; and
   (D) detecting means for detecting a relative angular displacement between said detecting body and said tubular casing about said rotational axis.

2. A device according to claim 1, wherein said magnetic material powder includes nickel.

3. A device according to claim 1, wherein said magnetic material powder includes a nickel-iron alloy.

4. A device according to claim 1, wherein said magnetic material powder includes ferrite.

5. A device according to claim 1, wherein said magnetic material powder includes at least one kind of rare-earth alloy.

6. A device according to claim 1, wherein said detecting body is formed of a thermoplastic, high polymeric organic material.

7. A device according to claim 6, wherein said magnetic material powder is dispersedly mixed with said thermoplastic, high polymeric organic material.

8. A device according to claim 7, wherein the mixture ratio of said magnetic material powder to said thermoplastic, high polymeric organic material is selected to make the specific gravity of said detecting body coincide with that of said liquid sealed in said tubular casing.

9. A device according to claim 1, wherein the mixture ratio of said magnetic material powder is selected to make the specific gravity of said detecting body coincide with that of said liquid sealed in said tubular casing.

10. A device according to claim 1, wherein said detecting body is formed by injection molding.

11. A device according to claim 1, wherein said magnetic material powder has particles coated with a silane or titanium coupling agent.

12. An angular displacement detecting device comprising:
   (A) a tubular casing having a chamber in which a liquid is sealed;
   (B) a detecting body disposed in said liquid sealed in said chamber, and supported for rotation about a predetermined rotational axis, a magnetic material powder having particles coated with a silane or titanium coupling agent being dispersedly mixed in said detecting body;
   (C) magnetic-path forming means for forming a magnetic path including said detecting body; and
   (D) detecting means for detecting a relative angular displacement between said detecting body and said tubular casing about said rotational axis.

13. A device according to claim 12, wherein said silane coupling agent is selected from the group consisting of γ-chloropropyl trimethoxy silane, vinyltrichlorosilane, vinyltriethoxysilane, vinyl-tris(β-methoxyethoxy) silane, γ-methacryloxypropyl trimethoxy silane, β-(3,4-epoxycyclohexyl) ethyl trimethoxy silane, γ-glycidoxyproplyl trimethoxy silane, γ-mercaptopropyl trimethoxy silane, γ-aminopropyl triethoxy silane, N-β-(aminoethyl) γ-aminopropyl trimethoxy silane, γ-ureidopropyl triethoxy silane, N-β-(aminoethyl)-γ-aminopropyl methyldimethoxy silane and so forth.

14. A device according to claim 12, wherein said titanium coupling agent is selected from the group consisting of isopropyl tri-isostearoyl titanate, isopropyl tridodecylbenzene sulfonyl titanate, tetraisopropylbis (dioctylphosphate) titanate, tetraoctylbis(di-tridecylphosphate) titanate, tetra(2,2-diaryloxymethyl-1-butyl)-bis(di-tridecyl)phosphate titanate, bis(dioctylpyrophosphate) oxyacetate titanate, tris(dioctylpyrophosphate)ethylene titanate and so forth.

15. A device according to claim 12, wherein said magnetic material powder includes nickel.

16. A device according to claim 12, wherein said magnetic material powder includes a nickel-iron alloy.

17. A device according to claim 12, wherein said magnetic material powder includes ferrite.

18. A device according to claim 12, wherein said magnetic material powder includes at least one kind of rare-earth alloy.

19. A device according to claim 12, wherein said detecting body is formed of a thermoplastic, high polymeric organic material.

20. A device according to claim 19, wherein said thermoplastic, high polymeric organic material is selected from the group consisting of polyethylene, polypropylene, polymethylpentene-1, polystyrene, ABS, polymethyl methacrylate, polycarbonate, polyoxymethylene, polyamide, polyethylene terephthalate, polybutylene telephthalate, polyphenylene sulfide, polyacrylate, polysulfone, polyether sulfone, polyether imide, polyether ether ketone, aromatic liquid crystal polyester and the like.

21. A device according to claim 19, wherein said magnetic material powder is dispersedly mixed with said thermoplastic, high polymeric organic material.

22. A device according to claim 21, wherein the mixture ratio of said magnetic material powder to said thermoplastic, high polymeric organic material is selected to make the specific gravity of said detecting body coincide with that of said liquid sealed in said tubular casing.

23. A device according to claim 12, wherein the mixture ratio of said magnetic material powder is selected to make the specific gravity of said detecting body coincide with that of said liquid sealed in said tubular casing.

24. A device according to claim 12, wherein said detecting body is formed by injection molding.

25. A device according to claim 6, wherein said thermoplastic, high polymeric organic material is selected from the group consisting of polyethylene, polypropylene, polymethylpentene-1, polystyrene, ABS resin such as polymethyl methacrylate, polycarbonate, polyoxymethylene polyamide, polyethylene terephthalate, polybutylene telephthalate, polyphenylene sulfide, polyacrylate, polysulfone, polyether sulfone, polyether imide, polyether ether ketone, aromatic liquid crystal polyester and the like.

26. A relative movement detecting device comprising:
(A) a movable body, a magnetic material powder with a particle size of 10 μm or less being dispersedly mixed in said movable body;
(B) supporting means for movably supporting said movable body;
(C) magnetic-path forming means for forming a magnetic path including said movable body; and
(D) detecting means for detecting a relative movement between said movable body and said supporting means.

27. A device according to claim 26, wherein said magnetic material powder includes nickel.

28. A device according to claim 26, wherein said magnetic material powder includes a nickel.iron alloy.

29. A device according to claim 26, wherein said magnetic material powder includes ferrite.

30. A device according to claim 26, wherein said magnetic material powder includes at least one kind of rare-earth alloy.

31. A device according to claim 26, wherein said movable body is formed of a thermoplastic, high polymeric organic material.

32. A device according to claim 31, wherein said magnetic material powder is dispersedly mixed with said thermoplastic, high polymeric organic material.

33. A device according to claim 26, wherein said movable body is formed by injection molding.

34. A device according to claim 26, wherein said magnetic material powder has particles coated with a silane or titanium coupling agent.

35. A device according to claim 31, wherein said thermoplastic, high polymeric organic material is selected from the group consisting of polyethylene, polypropylene, polymethylpentene-1, polystyrene, ABS, polymethyl methacrylate, polycarbonate, polyoxymethylene, polyamide, polyethylene terephthalate, polybutylene telephthalate, polyphenylene sulfide, polyacrylate, polysulfone, polyether sulfone, polyether imide, polyether ether ketone, aromatic liquid crystal polyester and the like.

36. A device according to claim 26, wherein said movable body is disposed in a liquid.

37. A device according to claim 36, wherein the mixture ratio of said magnetic material powder is selected to make the specific gravity of said movable body coincide with that of said liquid sealed in said supporting means.

38. A device according to claim 37, wherein said magnetic material powder is dispersedly mixed with said thermoplastic, high polymeric organic material.

39. A relative movement detecting device comprising:
(A) a movable body, a magnetic material powder whose particles are coated with a silane or titanium coupling agent being dispersedly mixed in said movable body;
(B) supporting means for movably supporting said movable body;
(C) magnetic path forming means for forming a magnetic path including said movable body; and
(D) detecting means for detecting a relative movement between said movable body and said supporting means.

40. A device according to claim 39, wherein said silane coupling agent is selected from the group consisting of γ-chloropropyl trimethoxy silane, vinyltrichlorosilane, vinyltriethoxysilane, vinyl-tris(β-methoxyethoxy) silane, γ-methacryloxypropyl trimethoxy silane, β-(3,4-epoxycyclohexyl) ethyl trimethoxy silane, γ-glycidoxyproplyl trimethoxy silane, γ-mercaptopropyl trimethoxy silane, γ-aminopropyl triethoxy silane, N-β-(aminoethyl) γ-aminopropyl trimethoxy silane, γ-ureidopropyl triethoxy silane, N-β-(aminoethyl)-γ-aminopropyl methyldimethoxy silane and so forth.

41. A device according to claim 39, wherein said titanium coupling agent is selected from the group consisting of isopropyl tri-isostearoyl titanate, isopropyl tridodecylbenzene sulfonyl titanate, tetraisopropylbis (dioctylphosphate) titanate, tetraoctylbis(di-tridecylphosphate) titanate, tetra(2,2-diaryloxymethyl-1-butyl)-bis(di-tridecyl)phosphate titanate, bis(dioctylpyrophosphate) oxyacetate titanate, tris(dioctylpyrophosphate)ethylene titanate and so forth.

42. A device according to claim 39, wherein said magnetic material powder includes nickel.

43. A device according to claim 39, wherein said magnetic material powder includes a nickel-iron alloy.

44. A device according to claim 39, wherein said magnetic material powder includes ferrite.

45. A device according to claim 39, wherein said magnetic material powder includes at least one kind of rare-earth alloy.

46. A device according to claim 39, wherein said movable body is formed of a thermoplastic, high polymeric organic material.

47. A device according to claim 46, wherein said thermoplastic, high polymeric organic material is selected from the group consisting of polyethylene, polypropylene, polymethylpentene-1, polystyrene, ABS, polymethyl methacrylate, polycarbonate, polyoxymethylene, polyamide, polyethylene terephthalate, polybutylene telephthalate, polyphenylene sulfide, polyacrylate, polysulfone, polyether sulfone, polyether imide, polyether ether ketone, aromatic liquid crystal polyester and the like.

48. A device according to claim 46, wherein said magnetic material powder is dispersedly mixed with said thermoplastic, high polymeric organic material.

49. A device according to claim 39, wherein said movable body is formed by injection molding.

50. A device according to claim 39, wherein said movable body is disposed in a liquid.

51. A device according to claim 50, wherein the mixture ratio of said magnetic material powder is selected to make the specific gravity of said movable body coincide with that of said liquid sealed in said supporting means.

52. A device according to claim 51, wherein said magnetic material powder is dispersedly mixed with said thermoplastic, high polymeric organic material.

53. A device according to claim 1, wherein said magnetic material powder includes iron.

* * * * *